(12) United States Patent
Krishnamurthy et al.

(10) Patent No.: US 8,737,330 B2
(45) Date of Patent: May 27, 2014

(54) MULTI-CLUSTER UPLINK TRANSMISSION IN WIRELESS COMMUNICATION NETWORK

(75) Inventors: Sandeep H. Krishnamurthy, Arlington Heights, IL (US); Colin D. Frank, Park Ridge, IL (US); Vijay Nangia, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 248 days.

(21) Appl. No.: 13/168,572

(22) Filed: Jun. 24, 2011

(65) Prior Publication Data

US 2012/0327866 A1    Dec. 27, 2012

(51) Int. Cl.
| | |
|---|---|
| *H04W 4/00* | (2009.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 74/00* | (2009.01) |

(52) U.S. Cl.
USPC ............................ 370/329; 370/252; 455/522

(58) Field of Classification Search
USPC .................................. 370/329, 252; 455/522
See application file for complete search history.

(56) References Cited

U.S. PATENT DOCUMENTS

| | | | |
|---|---|---|---|
| 7,711,385 B2 | 5/2010 | Ostman et al. | |
| 2010/0029289 A1 | 2/2010 | Love et al. | |
| 2010/0197339 A1* | 8/2010 | Pedersen et al. | 455/522 |
| 2011/0081936 A1* | 4/2011 | Haim et al. | 455/522 |
| 2011/0170435 A1 | 7/2011 | Kim et al. | |
| 2011/0170496 A1 | 7/2011 | Fong et al. | |
| 2011/0199986 A1 | 8/2011 | Fong et al. | |
| 2011/0319119 A1 | 12/2011 | Ishii | |
| 2011/0319120 A1 | 12/2011 | Chen et al. | |
| 2012/0009962 A1 | 1/2012 | Liu et al. | |
| 2012/0044898 A1 | 2/2012 | Ishii | |

FOREIGN PATENT DOCUMENTS

| | | |
|---|---|---|
| WO | 2011098275 A1 | 8/2011 |
| WO | 2011139201 A1 | 11/2011 |

OTHER PUBLICATIONS

Patent Cooperation Treaty, "PCT Search Report and Written Opinion of the International Searching Authority" for International Application No. PCT/US2012/040996 dated Nov. 6, 2012, 21 pages.

Draft 3GPP TS 36.213 Va.2.0 (Jun. 2011) 3rd Generation Partnership Project; Technical Specification Group Radio Access Network; Evolved Universal Terrestrial Radio Access (E-UTRA) Physical Layer Procedures (Release 10), 182 pages.

(Continued)

*Primary Examiner* — Asad Nawaz
*Assistant Examiner* — Stephanie Chang (57) ABSTRACT

A method in a wireless communication device comprises determining transmission powers for at least two clusters, wherein each cluster includes at least one physical resource block (RB), determining a difference in a characteristic of the transmission powers determined for the at least two clusters, and varying a transmit power allocated to at least one cluster if the difference in the characteristic exceeds a power spread threshold, wherein the power allocated to each cluster is a function of pathloss between the wireless communication device and a serving base station.

3 Claims, 6 Drawing Sheets

(56) References Cited

OTHER PUBLICATIONS

R4-113256 3GPP TR 36.807 v1.5.0 (May 2011) Technical Report, 3rd Generation Partnership Project; Technical Specification Group Radio Access Network; Evolved Universal Terrestrial Radio Access (E-UTRA); User Equipment (UE) Radio Transmission and Reception; (Release 10), 120 pages.
3GPP TSG RAN WG4 (Radio) #58, R4-111456 "A Note on MPR for Carrier Aggregation" Ericsson, ST-Ericsson; Taipei, Taiwan; Feb. 21-25, 2011, 6 pages.
3GPP TSG RAN WG4 #51, R4-092056 "Out of Band Emission and MPR for DC-HSUPA" Ericsson; San Francisco, USA; May 4-8, 2009, 6 pages.
Frank et al., "Method and System for Managing Transmit Power on a Wireless Communication Network" United States Patent and Trademark Office, U.S. Appl. No. 13/549,666, filed Jul. 16, 2012, 52 pages.
3GPP TSG RAN WG4 (Radio) #58AH, R4-112089 "MPR for non-contiguous transmission" Ericsson, ST-Ericsson; Shanghai, China; Apr. 11-15, 2011, 4 pages.
3GPP TSG RAN WG4 (Radio) #58 R4-110955 "MPR for LTE multi cluster transmission" Nokia, Renesas Electronics Europe; Taipei, Taiwan; 21-15 Feb. 2011, 22 pages.
3GPP TR 36.807 V0.1.0 (Aug. 2010) R4-103431, Technical Report, 3rd Generation Partnership Project; Technical Specification Group Radio Access Network; Evolved Universal Terrestrial Radio Access (E-UTRA); User Equipment (UE) radio transmission and reception; (Release 10), 94 pages.
Patent Cooperation Treaty, International Search Report and Written Opinion of the International Searching Authority for International Application No. PCT/US2013/046262, Sep. 26, 2013, all pages.
3GPP TR 36.807 v10.0.0 (Jul. 2007) "3rd Generation Partnership Project; Technical Specification Group Radio Access Network; Evolved Universal Terrestrial Radio Access (E-UTRA); User Equipment (UE) radio transmission and reception (Release 10)", 181 pgs.
3GPP TSG-RAN Working Group 4 (Radio) 357AH, R4-110458 "MPR for non-contiguous allocation", Nokia, Renesas Electronics Europe; Austin, Texas; Jan. 17-21, 2011, 22 pgs.
Frank et al., "Method and System for Managing Transmit Power on a Wireless Communication Network" United States Patent and Trademark Office U.S. Appl. No. 13/669,429, filed Nov. 5, 2012, 60 pages.
Patent Cooperation Treaty, International Search Report and Written Opinion of the International Searching Authority for International Application No. PCT/US2013/065845, Nov. 27, 2013, 13 pages.
3GPP TSG RAN WG4 #60, R4-114176, "RF Simulation results for multi-clustered simultaneous transmission for single CC and multiple CC", LG Electronics; Athens, Greece; Aug. 17, 2011, 14 pages.
Krishnamurthy et al., "Multi-Cluster Uplink Transmission in Wireless Communication Network" United States Patent and Trademark Office, U.S. Appl. No. 14/068,001, filed Oct. 31, 2013, 39 pages.

* cited by examiner

MULTI-CLUSTER UPLINK TRANSMISSION IN WIRELESS COMMUNICATION NETWORK

FIELD OF THE DISCLOSURE

The present disclosure relates generally to wireless communications and, more particularly, to managing transmit power in a wireless communication device for multi-cluster transmissions.

BACKGROUND

OFDM-based multi-cluster transmission has been specified in 3GPP LTE Rel-10 uplink within a component carrier and with carrier aggregation (e.g., intra-band contiguous carrier aggregation of two or more carriers), including simultaneous Physical Uplink Shared Channel (PUSCH)+PUSCH, PUSCH+Physical Uplink Control Channel (PUCCH), and SRS+SRS transmissions where the transmissions are made by a single power amplifier (PA) in the user equipment (UE). The need to meet out-of-band (including spurious emissions) and in-band emissions requirements necessitates a Maximum Power Reduction (MPR) on the uplink (UL) transmit power in the multi-cluster case. Recently, RAN4 endorsed a MPR mask equation for adoption into TR 36.807 wherein the mask is described as a piece-wise linear curve that is a function of an allocation ratio, which is equal to a sum of ratios of Resource Block (RB) allocation sizes of different clusters to the total UL bandwidth (BW) expressed in number of RBs.

Several problems arise with the proposed framework for RAN4. When there is a large power imbalance between any two clusters, the resource allocation can be either limited by Out-of-Band/In-Band (OOB/IB) emissions or by an error vector magnitude (EVM) on the cluster with lower transmit power. The current solution in TR 36.807 does not address this. For simultaneous PUSCH+PUCCH transmission with power spectral density (PSD) imbalance between PUSCH and PUCCH transmit powers, the current TR 36.807 formulation likely allows for a MPR that is much higher than necessary, which would lead to sub-optimal UE implementations and some loss in UL spectral efficiency. Further the MPR equation that is piece-wise linear in the allocation ratio (A) but, independent of other parameters such as edge ratio (E), gap ratio (G), etc. leads to over-dimensioning of the MPR, which again lead to the problems identified above.

Others have observed that PUSCH+PUCCH with power imbalance leads to a lower required backoff than allowed by the TR 36.807 piecewise linear mask. As a result UL spectral efficiency is negatively impacted if there are inefficiencies in UE implementations that make use of more backoff than is necessary. In general, using a piece-wise linear function of just one parameter (as in TR 36.807) can lead to over-dimensioning of the allowed MPR (more pessimistic than required to meet requirements). For example, from FIG. 4 in [1], for a allocation ratio equal to 0.1, the piece-wise linear parameterization of MPR in terms of the single parameter A leads to MPR=6 dB.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
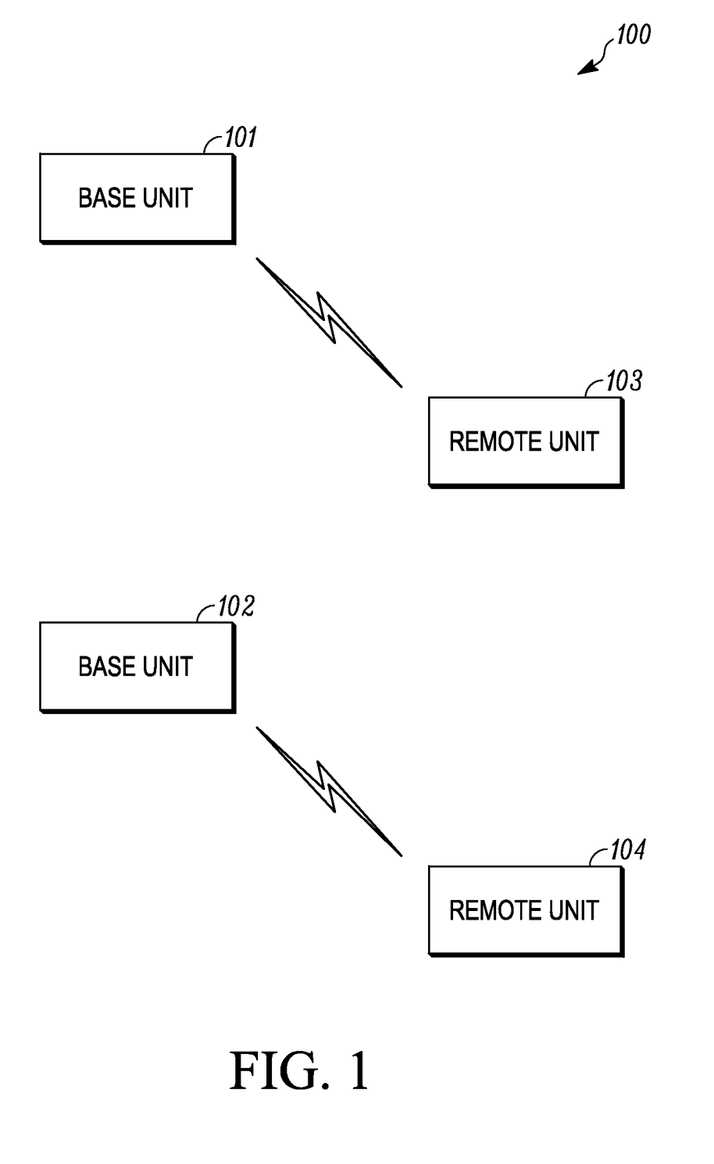
FIG. 1 is a wireless communication system.

In FIG. 1, a wireless communication system 100 comprises one or more fixed base infrastructure units 101, 102 forming a network distributed over a geographical region for serving remote units in the time, frequency or spatial domain or a combination thereof. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, pico-cell, network node or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay node, or by other terminology used in the art. The remote units also comprise one or more transmitters and one or more receivers. In FIG. 1, base unit 101 transmits downlink communication signals to serve remote unit 103 in the time, frequency or spatial domain. The remote unit 104 communicates with base unit 102 via uplink communication signals. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 10 (Rel-10) and later versions thereof, but may also be applicable to other wireless communication systems. More generally the wireless communication system may implement some other open or proprietary communication protocol, for example, IEEE 802.16(d) (WiMAX), IEEE 802.16(e) (mobile WiMAX), among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a Time Division Duplex (TDD) or Frequency Division Duplex (FDD) system.

Figure 2:
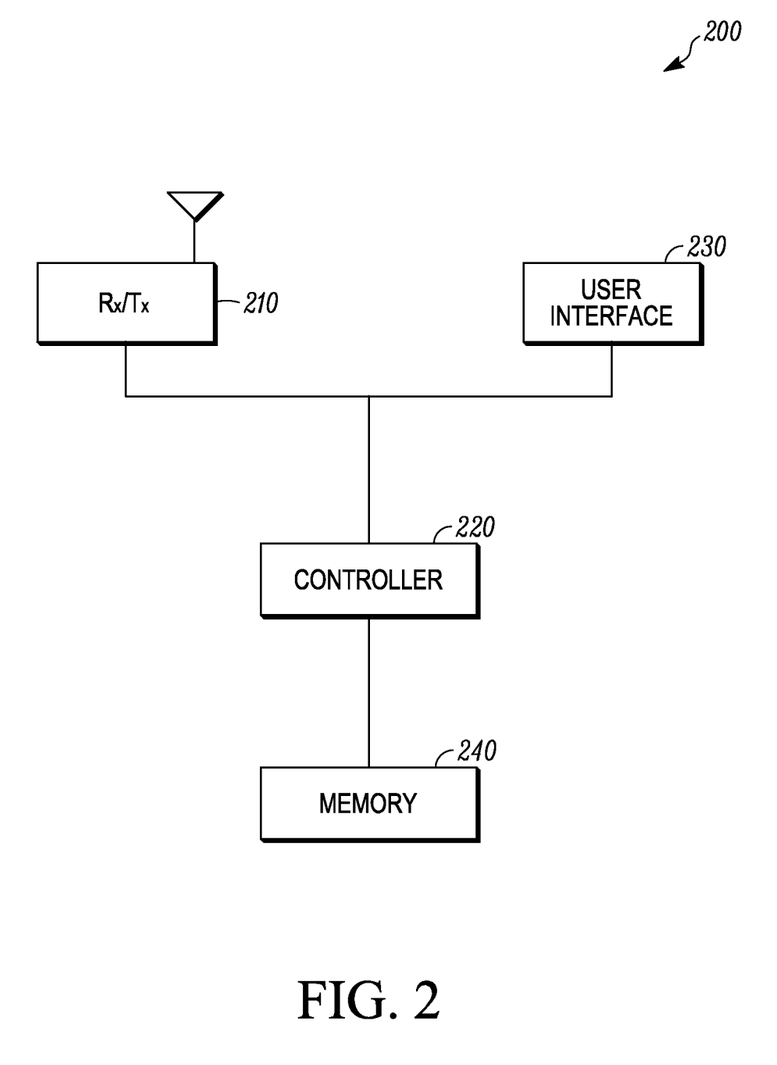
FIG. 2 is a schematic block diagram of a wireless communication device.

FIG. 2 illustrates a wireless communication terminal or device 200 comprising a transceiver 210 communicably coupled to a controller 220. The device implements a wireless communication protocols, as discussed above, and may be capable of conducting circuit or packet switched communications or both. The UE may also comprise a user interface 230 for performing other functionality typically associated with wireless communication terminals, including but not limited to a keypad or other input device, a display, audio inputs and outputs among other user interface devices. These and other elements of such terminals are well known to those of ordinary skill in the art and are not described further herein. In one embodiment, the controller is implemented as a digital processor that executes instruction stored in one or more memory devices 240 to perform the functionality described herein. Alternatively, the controller may be implemented as an equivalent hardware circuit or as a combination of hardware and software. In one embodiment, various aspects of which are described further below in the context of an LTE communication system, the device is a Discrete Fourier Transform-Spread-Orthogonal Frequency Division Multiple Access (DFT-S-OFDMA) UE. Alternatively, the device may implement one or more other protocols.

As indicated above, OFDM-based multi-cluster transmission (e.g., multi-cluster DFT-S-OFDMA with DFT-spreading in each cluster or across clusters, multi-cluster SC-FDMA transmission) within a component carrier and with carrier aggregation (e.g., intra-band contiguous carrier aggregation of two or more carriers) has been specified in 3GPP LTE Rel-10, including simultaneous PUSCH+PUSCH, PUSCH+PUCCH and SRS+SRS transmissions where the transmissions are made by a single power amplifier (PA) in the user equipment (UE). While one embodiment described herein is implemented with a single PA, other embodiments may be implemented using multiple amplifiers. RAN4 recently endorsed an MPR formula for UE multi-cluster transmission for intra-band carrier aggregation (CA) (TR 36.307) as follows:

$$\begin{aligned}MPR &= 7.2, & 0 < A \le 0.05 \\ &= 8 - 16A, & 0.05 < A \le 0.25 \\ &= 4.83 - 3.33A, & 0.25 < A \le 0.4 \\ &= 3.83 - 0.83A, & 0.4 < A \le 1\end{aligned}$$

where A=sum of allocation ratios=$a_1+a_2+\ldots+a_N$, where $a_1,\ldots,a_N$ are allocation ratios of different clusters, wherein an allocation ratio is the ratio of the number of allocated RBs in a cluster to the configured uplink (UL) bandwidth ($N_{RB}$).

Alternatively, $A=N_{RB\_alloc}/N_{RB}$ where $N\,RB_{\_alloc}$ is the sum of the allocated RBs in the different clusters. The above formulation assumes that the PSD for the different clusters are the same. Also proposed is MPR as a function of a number of parameters, MPR=f(A, E, B, G, W), where f( ) is a multi-linear function of the argument parameters, where: A=sum ($A_1\ldots,A_n$) (i.e. the total RB allocation across all clusters); E=min($E_L$, $E_R$) (i.e. the minimum distance from the edge of the outside clusters to the edge of the CCs); B=abs($A_1-A_N$) (i.e. the difference between the RB allocations of the two edge clusters); G=the maximum gap between two adjacent RB clusters; $A_n$=the width of the nth cluster allocation; $E_L$=the distance from the edge of the first cluster to the left hand edge of the first component carrier; $E_R$=the distance from the edge of the last cluster to the right hand edge of the last component carrier; and W=the distance from the left hand edge of the first cluster to the right hand edge of the last cluster. All of the above quantities except $E_L$ and $E_R$ are normalized by the configured UL bandwidth $N_{RB}$. $E_L$ and $E_R$ are normalized by $N_{RB}/2$.

In LTE, the UE sets a PUSCH transmit power in subframe n as determined by the equation:

$$P_{PUSCH}(n) = \min\left\{\begin{array}{l}P_{CMAX}(n),\\ 10\log_{10}(M_{PUSCH}(n)) + P_{O\_PUSCH} + \alpha \cdot PL + \Delta_{TF}(i) + f(i)\end{array}\right\},$$

where $P_{PUSCH}$(n) is the PUSCH transmit power in uplink subframe n, $P_{CMAX}$(n) is the configured maximum transmit power, $M_{PUSCH}$(n) is the bandwidth of the PUSCH resource assignment in subframe n, $P_{O\_PUSCH}$ is the PUSCH power offset configured by higher layers, α is the fractional power control coefficient configured by higher layers, PL is the path loss associated with the eNB-UE link, $\Delta_{TF}$(i) is the power control delta function of the transport format on an uplink shared channel (UL-SCH) configured by higher layers, and f(i) is the power term when power control accumulation is enabled for subframe n when subframe n happens to be the i-th subframe since accumulation was reset.

In the above equation, i is the number of subframes over which power offsets derived from transmit power control (TPC) commands were accumulated. Therefore, i=n−$n_{RESET}$ where, $n_{RESET}$ is the subframe index of the subframe where power accumulation due to TPC commands was last reset. The TPC commands are transmitted in downlink control information (DCI) transported over PDCCH (Physical Downlink Control Channel). The serving cell can transmit a TPC command applicable to loop 1 on subframe (n−k) where for example k=4 or k=6. Upon receiving the TPC command, the UE applies the closed-loop power control update:

$$f(i)=f(i-1)+\delta_{PUSCH}(i-K_{PUSCH})$$

where $\delta_{PUSCH}$ is determined based on the TPC command applicable to loop j and $K_{PUSCH}$=4 or 6.

Similarly, power control for other physical uplink channel transmissions such as PUCCH, SRS, Demodulation Reference Signal (DM-RS), etc. can be formulated and similar equations can be written down for PUCCH, SRS, and DM-RS transmissions.

Embodiment 1

Problems 1 & 2

The MPR parameterization in TR 36.807 leads to inconsistent application of backoff when there is a large power imbalance between the clusters. The clusters may be in the same component carrier (CC) (e.g., one or more cluster corresponding to PUSCH and one cluster (with one RB) corresponding to PUCCH) or in multiple component carriers (e.g., one PUSCH cluster in each component carrier with possibly one of the PUSCH carrying Uplink Control Information or UCIPUCCH on one CC and PUSCH(s) on same and/or different CCs, one cluster corresponding to SRS transmission in each component carrier (SRS+SRS)). The power or PSD imbalance may be a result of for example different resource allocation sizes for the different clusters, different power control targets, or different number of antenna ports active on the different clusters. For example, consider the case of three clusters with allocation ratios $a_1$, $a_2$ and $a_3$ (and transmit power levels $p_1$, $p_2$ and $p_3$ as determined by the respective power control equations). The following condition must be satisfied: $P_{min} = -44$ dBm$<=10$ log $10(p_1)$, $10$ log $10(p_2)$, $10$ log $10(p_3)$, $10$ log $10(p_1+p_2+p_3)<=P_{C,MAX}=23$ dBm.

Consider the example of aggregating 2 contiguous UL carriers with PUSCH+PUCCH on one carrier and PUSCH on the other carrier. Suppose, cluster #1 $a_1=0.5$ (PUSCH on carrier #1, 25 PRB allocation for 10 MHz), cluster #2 $a_2=0.02$ (PUCCH on carrier #1 with 1 PRB for 10 MHz) and cluster #3 $a_3=0.1$ (PUSCH on carrier #2 with 5 PRBs for 10 MHz) resulting in $A=a_1+a_2+a_3=0.62$. From TR 36.807, an MPR=3.3 dB is allowed. In the limiting case that the power for cluster 1 is reduced close to the minimum transmit power of −44 dBm, although the first cluster is active, the UE total transmission power is mostly contained within cluster #2 and cluster #3. In such a case, the IB and OOB signals resulting from phase noise, IQ imbalance and PA non-linearity are dominated by cluster #2 and cluster #3. From an IB/OOB emissions standpoint, it is as if the UE is transmitting on just two clusters and thus the MPR required should be typically smaller. With only cluster #2 and cluster #3 active, the new total allocation ratio is A'=a2+a3=0.12 and the TR 36.807 equation allows an MPR=6.1 dB (>3.3 dB) which may not be the correct order of the power reduction limit necessary for transmitting cluster #2 and cluster #3 only.

IQ imbalance originates from the LO and mixer (gain and phase imbalance in the IQ modulator). This together with DC offset (LO leakage) and PA non-linearity leads to an image problem. The desired transmission of a 10 PRB allocation on the upper edge of the aggregated BW results in an image on the lower side of the BW that is around 25 dB lower in PSD. With single PA architecture, the IB image can result in increased EVM in multi-cluster transmissions if the second cluster falls on RBs that overlap with the image of the first cluster. Again, arbitrary power imbalance between the clusters leads to the UE being unable to meet transmission signal quality requirements applicable to individual clusters. A simple approach may be to relax the transmit EVM requirements (17.5% for BPSK/QPSK and 12.5% for 16QAM) which may or may not be acceptable from a UL demodulation standpoint. Alternatively, meeting the EVM requirements would necessitate more stringent linearity requirements in transmitter components (such as PA, modulators, mixers etc.), which increases UE cost and/or current drain. This would result in the linearity requirements of the transmitter to be driven more by EVM and not so much by ACLR (Adjacent Channel Leakage Ratio) or OOB emissions requirements.

Solution A to Problems 1 & 2

One solution to the problems described above is to add a transmission power dimension to the MPR parameterization: MPR=f(A, E, B, G, W, $\{p_1, p_2, \ldots, p_N\}$) where $\{p_1, p_2, \ldots, p_N\}$ denotes either the transmission power of the N clusters or the cluster PSDs (i.e., PSD of a j-th cluster, $PSD_j=p_j/M_j$ where $M_j$ is the number of RBs in the j-th cluster). The spread of the power allocation can then be limited by stating in the specification that the piecewise linear MPR parameterization in TR 36.807 is applicable only if the difference between the maximum and minimum satisfies an upper bound as follows:

$$L_{spread} := \max\{p_1, p_2, \ldots, p_N\} - \min\{p_1, p_2, \ldots, p_N\} <= L_{max-min} \text{ (say, } L_{max-min} \text{ such that } 10 \log 10(L_{max-min}) <= 15 \text{ dB)}.$$

Alternately, different piecewise linear masks can be applied to different ranges of $L_{spread}$. For example, MPR=f1(A) if $0<=L_{spread}<=$a first threshold (e.g., f1(A) can be the same piecewise linear function as specified in TR 36.807). MPR=f2(A) if first threshold$<L_{spread}<=$a second threshold (e.g., f2(A) is a second MPR bound); and an MPR requirement is not specified for $L_{spread}>$second threshold. If f2(A) allows a larger backoff than that allowed by f1(A), the UE will be able to address both the large power imbalance and also maintain transmit signal quality on the clusters with lower transmit power by simply reducing the transmission power on the cluster with the maximum transmit power. The UE transmits on the clusters with the determined transmit powers.

Solution B to Problems 1 & 2

An alternative solution to the problems described in connection with process 300 illustrated in FIG. 3. At 310, a wireless communication device (e.g., a DFT-S-OFDM UE) determines transmission powers for at least two clusters wherein each cluster includes at least one physical resource block (RB). In one embodiment, each cluster is on a different carrier and in another embodiment all of the clusters are on a common carrier. In a LTE Rel-10 implementation, one of the at least two clusters can be for a PUCCH transmission and another of the at least two clusters is for a PUSCH transmission. Alternatively, the at least two clusters are both for a PUSCH transmission. Alternatively, the at least two clusters are both for a SRS transmission. In other implementations the clusters could be used for transmissions other than PUCCH, PUSCH and SRS such as Demodulation Reference Signal (DM-RS) transmission. The at least two clusters, whether for PUCCH and PUSCH transmission, PUSCH only transmissions, SRS and SRS transmission, or some other transmission or transmissions, may be on the same or different carriers.

Figure 3:
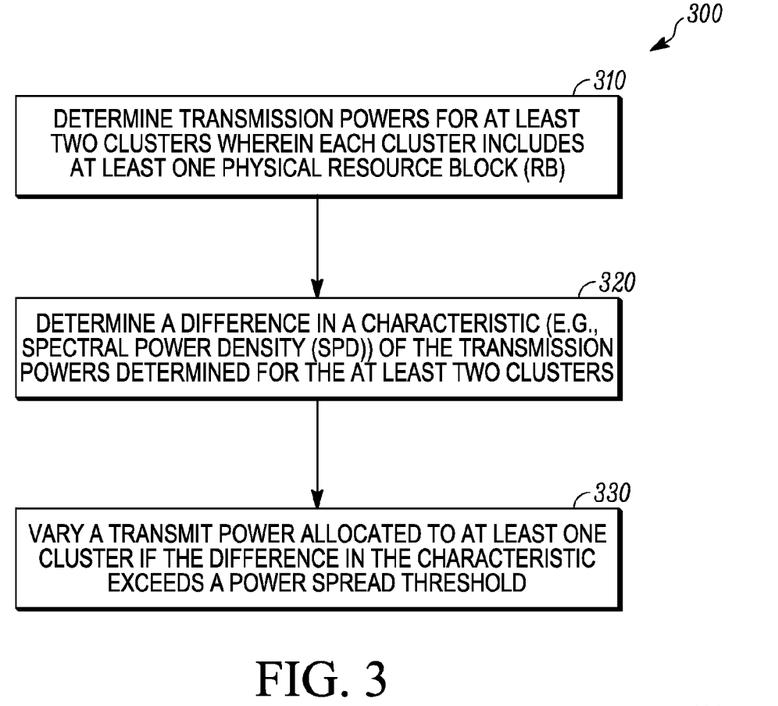
FIG. 3 is a process flow diagram.

In FIG. 3, at 320, the wireless communication device determines a difference in a characteristic of the transmission powers determined for the at least two clusters. The transmission power characteristic could be total transmit power, power spectral density (PSD) or any other measurable aspect of the transmission power. At 330, the wireless communication device varies a transmit power allocated to at least one of the clusters if the difference in the characteristic exceeds a power spread threshold. Generally, the power allocated to each cluster is a function of pathloss between the wireless communication device and a serving base station.

In one case, the wireless communication device reduces a transmit power allocated to at least one cluster if the difference in the power characteristic exceeds the threshold. The transmit power allocated to the at least one cluster may be reduced subject to the following expressions:

$$\sum_{j \neq j_0} w_j(i) \cdot \hat{P}_{PUSCH,j}(i) \leq \hat{P}_{c,max}(i) - \hat{P}_{PUCCH}(i) -$$

$$\hat{P}_{PUSCH,j_0}(i) \max_j \left( w_j(i) \hat{P}_{PUSCH,j}(i) \right) - \min_j \left( w_j(i) \cdot \hat{P}_{PUSCH,j}(i) \right) \leq P_{spread},$$

where $\min_j(\ )$ is taken over only positive-valued arguments where $\hat{P}_{PUSCH,j}(i)$ is a linear value of the power allocated to a j-th PUSCH channel in subframe i; $\hat{P}_{c,max}(i)$ is a configured maximum transmit power; $\hat{P}_{PUSCH,j}(i)$ is a linear value of the power allocated to a PUCCH channel in subframe i; $w_j(i)$ is a power scaling factor applied to a j-th PUSCH channel in subframe i; Index $j=j_0$ corresponds to a PUSCH channel carrying Uplink Control Information (UCI). In one implementation, a power scaling factor $w_j(i)$ is set to zero for at least one index j. The UE transmits on the clusters with the determined transmit powers.

In another case the wireless communication device increases the transmit power allocated to the at least one cluster if the difference in the power characteristic exceeds the threshold. The transmit power allocated to the at least one cluster may be increased subject to the expressions:

$$\sum_{j \neq j_0} w_j(i) \cdot \hat{P}_{PUSCH,j}(i) \leq \hat{P}_{c,max}(i) - \hat{P}_{PUCCH}(i) -$$

$$\hat{P}_{PUSCH,j_0}(i)\max_j(w_j(i)\hat{P}_{PUSCH,j}(i)) - \min_j(w_j(i) \cdot \hat{P}_{PUSCH,j}(i)) \leq P_{spread},$$

where $\min_j()$ is taken over only positive-valued arguments, where $\hat{P}_{PUSCH,j}(i)$ is a linear value of the power allocated to a j-th PUSCH channel in subframe i; $\hat{P}_{c,max}(i)$ is a configured maximum transmit power; $\hat{P}_{PUSCH,j}(i)$ is a linear value of the power allocated to PUCCH channel in subframe i; $w_j(i)$ is a power scaling factor applied to a j-th PUSCH channel in subframe i; Index $j=j_0$ corresponds to a PUSCH carrying Uplink Control Information (UCI).

In an LTE Rel-10, as per the specification TS 36.213 version a.1.0, PUSCH transmission power may be scaled with respect to $\hat{P}_{PUSCH,j}(i)$ and $\hat{P}_{CMAX}(i)$, where $\hat{P}_{PUSCH,j}(i)$ and $\hat{P}_{PUSCH,j}(i)$ are respectively the linear values of the PUCCH transmit power and Pc,max [dB]. The component carrier with index c is designated as serving cell c. If the total transmit power of the UE in subframe i would exceed $\hat{P}_{CMAX}(i)$, the UE scales $\hat{P}_{PUSCH,j}(i)$ for the serving cell c in subframe i such that the condition $$\sum_c w_c(i) \cdot \hat{P}_{PUSCH,c}(i) \leq (\hat{P}_{CMAX}(i) - \hat{P}_{PUCCH}(i))$$

The weights $w_c(i)$ here are a function of the subframe index i. The specification allows $w_c(i)$ values for certain serving cells to be zero. But, all the serving cells that have a non-zero scaling factor $w_c(i)$ have the same scaling factor $w_c(i)=w(i)$.

In the above inequality, $\hat{P}_{PUSCH}(i)$ is the linear value of $P_{PUSCH}(i)$, $\hat{P}_{PUSCH,c}(i)$ is the linear value of $P_{PUSCH,c}(i)$, $\hat{P}_{c,max}(i)$ is the linear value of the UE total configured maximum output power $P_{CMAX}$ in subframe i is as defined in 3GPP specification TS 36.101 and $w_c(i)$ is a scaling factor of $\hat{P}_{PUSCH,c}(i)$ for serving cell c where $0 \leq w_c(i) \leq 1$. In case there is no PUCCH transmission in subframe i, $\hat{P}_{PUSCH,j}(i)=0$.

If the UE has PUSCH transmission with UCI on cell j and PUSCH without UCI in the remaining cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \neq j} w_c(i) \cdot \hat{P}_{PUSCH,c}(i) \leq (\hat{P}_{CMAX}(i) - \hat{P}_{PUSCH,j}(i))$$

is satisfied where $\hat{P}_{PUSCH,j}(i)$ is the PUSCH transmit power for the cell with UCI and $w_c(i)$ is a scaling factor of $\hat{P}_{PUSCH,c}(i)$ for serving cell c without UCI.

Consider the simplest case of PUSCH+PUCCH. If it turns out that $\hat{P}_{PUSCH}(i)-\hat{P}_{PUSCH,c}(i)$ exceeds a threshold, the UE can simply be allowed to suspend PUSCH transmission or transmit PUSCH with a larger EVM limit. Similar treatment can be offered to PUSCH (non-UCI)+PUSCH (UCI). If the UE drops PUSCH in a predictable way (i.e., determined by known thresholds and equations), the eNB demodulation performance is not degraded. Additionally, the eNB may be able to schedule a different user (UE2) on the RBs (e.g., non-adaptive retransmissions) which the original user (UE1) drops PUSCH on leading to utilization of resources and improved UL spectral efficiency.

For PUSCH (non-UCI)+PUSCH (non-UCI) and no PUCCH, the transmit powers on the two PUSCH clusters can be re-scaled such that the PSD differences between the clusters are below a threshold $P_{spread}$, $$\sum_{j \neq j_0} w_j(i) \cdot \hat{P}_{PUSCH,j}(i) \leq \hat{P}_{c,max}(i) - \hat{P}_{PUCCH}(i) -$$

$$\hat{P}_{PUSCH,j_0}(i)\max_j(w_j(i)\hat{P}_{PUSCH,j}(i)) - \min_j(w_j(i) \cdot \hat{P}_{PUSCH,j}(i)) \leq P_{spread},$$

where $\min_j()$ is taken over only positive-valued arguments, where $\hat{P}_{PUSCH,j}(i)$ is a linear value of the power allocated to a j-th PUSCH channel in subframe i; $\hat{P}_{c,max}(i)$ is a configured maximum transmit power; $\hat{P}_{PUSCH,j}(i)$ is a linear value of the power allocated to PUCCH channel in subframe i; $w_j(i)$ is a power scaling factor applied to a j-th PUSCH channel in subframe i; Index $j=j_0$ corresponds to a PUSCH carrying Uplink Control Information (UCI).

Thus, with solution B, if the power/PSD difference between clusters is greater than a threshold $P_{spread}$ then the UE is allowed to rescale the powers to bring the power difference between clusters below the threshold $P_{spread}$. The powers of the PUCCH and PUSCH with UCI do not change due to priority. The UE may set the power of some PUSCH without UCI to zero, if the power difference condition cannot be satisfied.

Embodiment 2

Problem 3

Others have observed that a PUSCH+PUCCH with power imbalance among clusters leads to a lower required backoff than allowed by the proposed TR 36.807 piecewise linear mask. As a result, uplink spectral efficiency is negatively impacted if there are inefficiencies in UE implementations that make use of more backoff than is necessary.

Solution to Problem 3

One solution to problem 3 above is described in connection with process 400 illustrated in FIG. 4. At 410, a wireless communication device (e.g., a DFT-S-OFDM UE) determines a difference in a power characteristic for at least two clusters, wherein each cluster includes at least one physical resource block (RB). The power characteristic could be total transmit power, power spectral density (PSD) or any other measurable aspect of the transmission power.

In one embodiment, each cluster is on a different carrier and in another embodiment all of the clusters are on a common carrier. In a LTE Rel-10 implementation, one of the at least two clusters is for a PUCCH transmission and another of the at least two clusters is for a PUSCH transmission. Alternatively, the at least two clusters are both for a PUSCH transmission. Alternatively, the at least two clusters are both for a SRS transmission. In other implementations the clusters could be used for transmissions other than PUCCH PUSCH and SRS such as Demodulation Reference Signal (DM-RS) transmission. The at least two clusters, whether for PUCCH and PUSCH transmission, PUSCH only transmissions, SRS and SRS transmission, or some other transmission or transmissions, may be on the same or different carriers.

Figure 4:
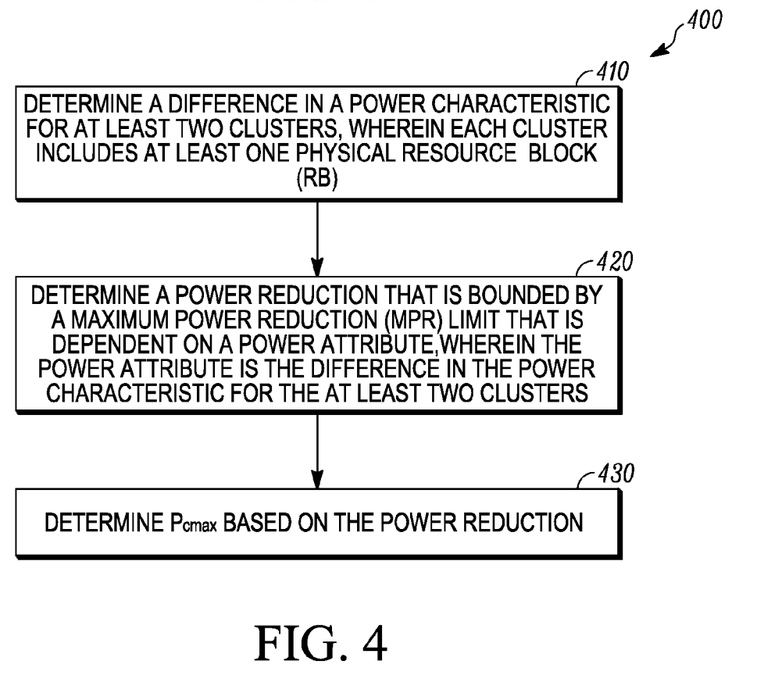
FIG. 4 is a process flow diagram.

In FIG. 4 at 420, the wireless communication device determines a power reduction that is bounded by a maximum power reduction (MPR) limit that is dependent on a power attribute, wherein the power attribute is the difference in the power characteristic for the at least two clusters. In one embodiment, the MPR limit is based on a piecewise linear function. One such function is based on the MPR formula for UE multi-cluster transmission for intra-band carrier aggregation (TR 36.307) recently proposed for RAN4 as described below.

For PUSCH+PUCCH, PUCCH cluster is typically transmitted at a higher power than PUSCH cluster which will likely need a smaller MPR than that specified by the 36.307 formula. The MPR mask can be modified for the case of PUSCH+PUCCH to:

$$\begin{aligned}MPR &= 7.2 - \alpha_1(\Delta PSD), & 0 < A \le 0.05\\ &= 8 - \alpha_2(\Delta PSD) - 16A, & 0.05 < A \le 0.25\\ &= 4.83 - \alpha_3(\Delta PSD) - 3.33A, & 0.25 < A \le 0.4\\ &= 3.83 - \alpha_4(\Delta PSD) - 0.83A, & 0.4 < A \le 1\end{aligned}$$

where $\alpha_j > 0$ and $\Delta PSD$=maximum of the PSD difference PUSCH and PUCCH clusters. If $\Delta PSD=0$, this formula becomes identical to the TR 36.807 formula.

It is likely that the IB/OOB emission levels can be more accurately described as a function of the difference in the transmission powers on the clusters rather than on the PSDs (due to their dependence of IB/OOB components on the signal self-convolution). If this is the case, an alternative could be to express the MPR mask as a function of the absolute transmission power difference:

$$\begin{aligned}MPR &= 7.2 - \alpha_1\Delta P, & 0 < A \le 0.05\\ &= 8 - \alpha_2\Delta P - 16A, & 0.05 < A \le 0.25\\ &= 4.83 - \alpha_3\Delta P - 3.33A, & 0.25 < A \le 0.4\\ &= 3.83 - \alpha_4\Delta P - 0.83A, & 0.4 < A \le 1\end{aligned}$$

where $\alpha_j > 0$ and $\Delta P$ is the maximum of difference in the transmission powers between any two clusters. Again for the equal power case, $\Delta P=0$, and we get the back the TR 36.807 formula.

More generally, MPR=$g(\Delta P, A)$ can be used to generalize this dependence. A precise relationship between MPR and $\Delta PSD$ or $\Delta P$ has not yet been established. But, by Taylor series approximation, MPR can be expressed as a linear or even a piece-wise linear function of $\Delta PSD$ or $\Delta P$. Higher order polynomial terms (e.g., quadratic or cubic) can be used to improve the accuracy of the fit.

In one embodiment, the MPR limit is computed based on the following equation:

$$MPR = \alpha_0(R_A, R_{\Delta P}) - \alpha_1(R_A, R_{\Delta P})A - \alpha_2(R_A, R_{\Delta P})\Delta P, \text{ for } A \in R_A \text{ and } \Delta P \in R_{\Delta P}$$

where A is an allocation ratio of the clusters; $\Delta P$ is a difference in the power characteristic for the two clusters; $R_A$ is a range of values that A can take; $R_{\Delta P}$ is a range of values $\Delta P$ can take; $\{\alpha_j(R_A, R_{\Delta P})\}_{j=0,1,2}$ are non-negative real numbers that depend on the range of A and $\Delta P$.

In FIG. 4, at 430, the wireless communication device determines $P_{CMAX}$ based on the power reduction. $P_{CMAX}$ may be used to determine one or more power metrics used by the wireless communication device or the serving base station or both. Exemplary power metrics that may be determined from the power reduction includes, but are not limited to, uplink (UL) transmit power and power headroom (PH). The wireless communication device typically reports some of these and other power metrics determined from the power reduction to a serving base station. For example, an LTE UE reports power headroom in a power headroom report (PHR) to a serving eNB.

Embodiment 3

Problem 4

Figure 5:
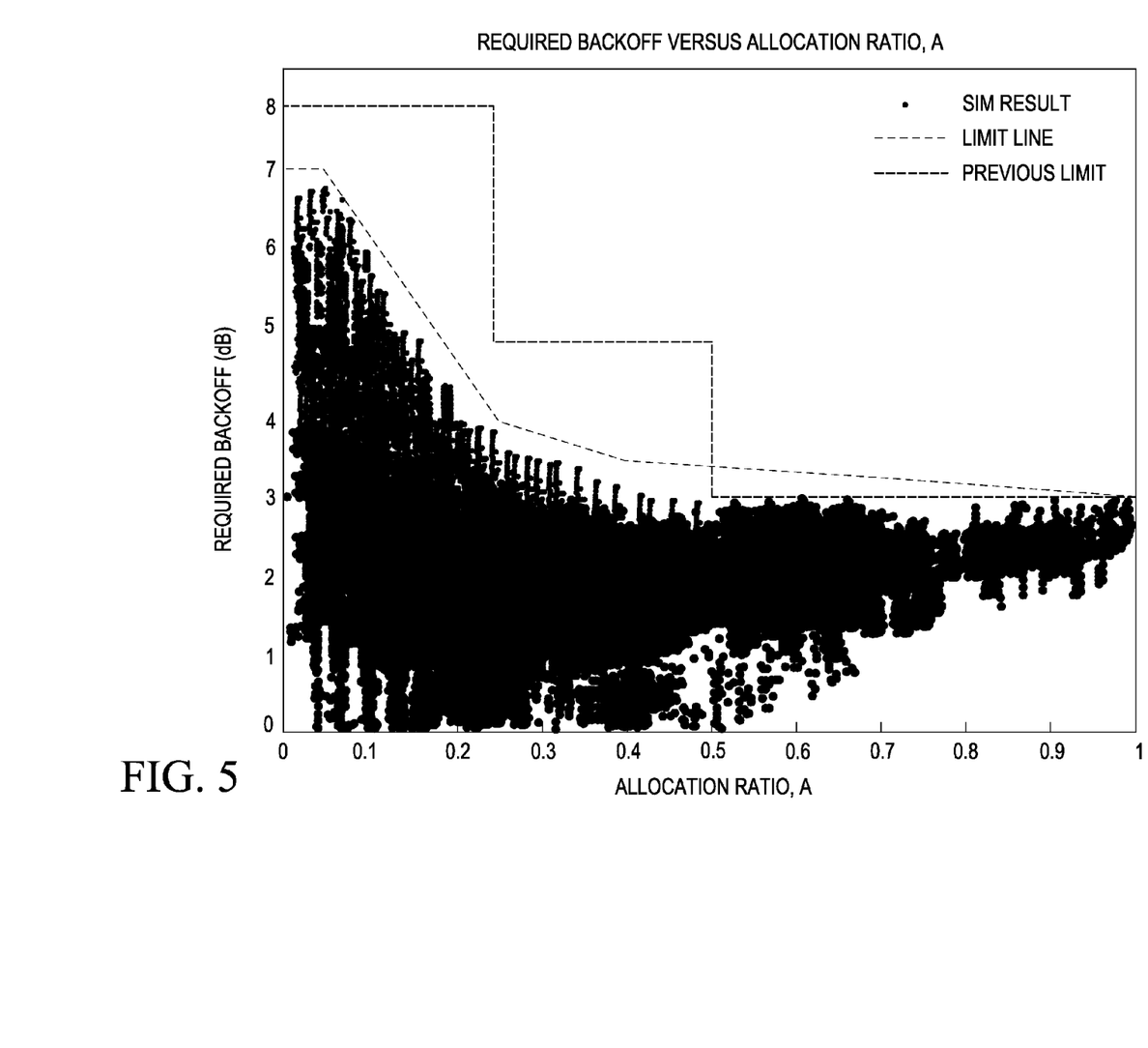
FIG. 5 is a plot of power backoff versus allocation ratio.

In general, using a piece-wise linear function of just one parameter (as in TR 36.807) can lead to over-dimensioning of the allowed MPR. For example, from FIG. 5, for a sum allocation ratio equal to 0.1, the piece-wise linear parameterization of MPR in terms of the single parameter A leads to MPR=6 dB. But, clearly, MPR=6 dB is an upper bound and there are a large number of multi-cluster combinations that do not require a 6 dB backoff. In FIG. 4, which illustrates a MPR mask in TR 36.807, it can be seen that the allowed MPR can exceed the required backoff by as much as 7 dB, and for small allocations, the allowed MPR typically exceeds the required backoff by 2-3 dB. Allowing a larger MPR than necessary can lead to UE implementations that sub-optimally apply a large backoff thus reducing UL spectral efficiency. FIG. 5 illustrates that a better rule is required for small allocations (i.e., A<0.5).

Solution to Problem 4

One solution to problem 4 above is described in connection with process 600 illustrated in FIG. 6. At 610, a wireless communication device determines a first attribute and a second attribute based on characteristics of at least two clusters, wherein each cluster includes at least one resource block, the first attribute is different than the second attribute.

In one embodiment, each cluster is on a different carrier and in another embodiment all of the clusters are on a common carrier. In a LTE Rel-10 implementation, one of the at least two clusters is for a PUCCH transmission and another of the at least two clusters is for a PUSCH transmission. Alternatively, the at least two clusters are both for a PUSCH transmission. Alternatively, the at least two clusters are both for a SRS transmission. In other implementations the clusters could be used for transmissions other than PUCCH PUSCH and SRS such as Demodulation Reference Signal (DM-RS) transmission. The at least two clusters, whether for PUCCH and PUSCH transmission, PUSCH only transmissions, SRS and SRS transmission or some other transmission or transmissions, may be on the same or different carriers.

In one embodiment, the characteristics of the at least two clusters is selected from a group comprising: a size of the at least two clusters; a spectral distance between the at least two clusters; a distance between outermost clusters of the at least two clusters to an edge of a carrier for each of the outermost clusters; a full span in a frequency domain of the at least two clusters; an absolute value of the size difference between the cluster at the left-most edge and the right-most edge of the configured UL bandwidth; or a difference in a power characteristic for the at least two clusters. In another embodiment, the first attribute and the second attribute each include one or more of the following characteristics: a size of the at least two clusters; a spectral distance between the at least two clusters; a distance between clusters to an edge of a carrier for the at least two clusters; a full span in a frequency domain of the at least two clusters; a size difference between a cluster with the maximum size and a cluster with a minimum size; a difference in a power characteristic for the at least two clusters.

Figure 6:
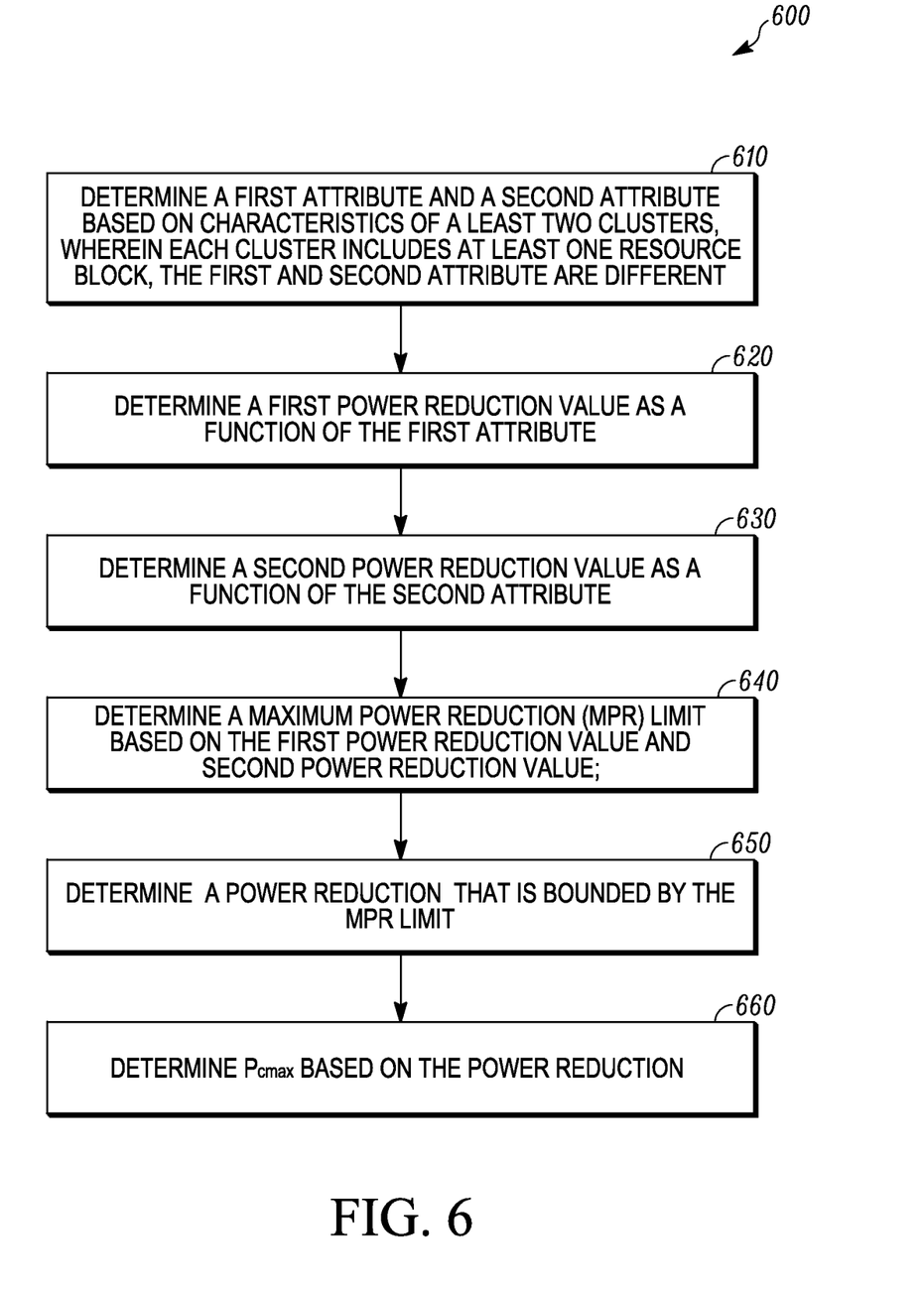
FIG. 6 is a process flow diagram.

In FIG. 6 at 620, the wireless communication device determines a first power reduction value as function of the first attribute and at 630 the device determines a second power reduction value as function of the second attribute. At 640, the wireless communication device determines a maximum power reduction (MPR) limit based on the first power reduction value and second power reduction value. In one embodiment, determination of the MPR limit includes equating the MPR limit to a lower of the first and second power reduction values. In FIG. 6 at 650, the wireless communication device determines a power reduction that is bounded by the MPR limit.

In FIG. 6 at 660, the wireless communication device determines $P_{CMAX}$ based on the power reduction. $P_{CMAX}$ may be used to determine one or more power metrics used by the wireless communication device or the serving base station or both. Exemplary power metrics that may be determined from the power reduction includes, but are not limited to, uplink (UL) transmit power and power headroom (PH). The wireless communication device typically reports some of these and other power metrics determined from the power reduction to a serving base station. For example, an LTE UE reports power headroom in a power headroom report (PHR) to a serving eNB.

The basis for equating MPR to the lower (or minimum) of the two power reduction limits is explained below.

Consider a function of two variables $Y=f(X_1, X_2)$. Suppose that $$g_1(X_1) = \max_{X_2 \in \chi_2} f(X_1, X_2)$$

$$g_2(X_2) = \max_{X_1 \in \chi_1} f(X_1, X_2)$$

where $\chi_j$ is the set of the range of values that $X_j$ can take. Clearly, we have the following inequalities:

$Y \leq \min\{g_1(X_1), g_2(X_2)\} \leq g_1(X_1).$

In other words, using min $\{g_1(X_1), g_2(X_2)\}$ can potentially lead to a tighter upper bound on Y than simply using $g_1(X_1)$. In TR 36.807, for the MPR requirements, we have Y=MPR and $X_1$=A. Instead of using the point-wise maximum $g_1(X_1)$, a piece-wise linear function is used as a mask for bounding MPR as a function of A. From the above observation, if we constructed a similar piece-wise linear approximation or mask for $g_2(X_2)$ based on some other variable $X_2 \in \{W, E, G, B\}$, we can achieve a bound on MPR that is potentially lower that the individual masks $g_1(X_1)$ and $g_2(X_2)$ by taking the minimum.

Figure 7:
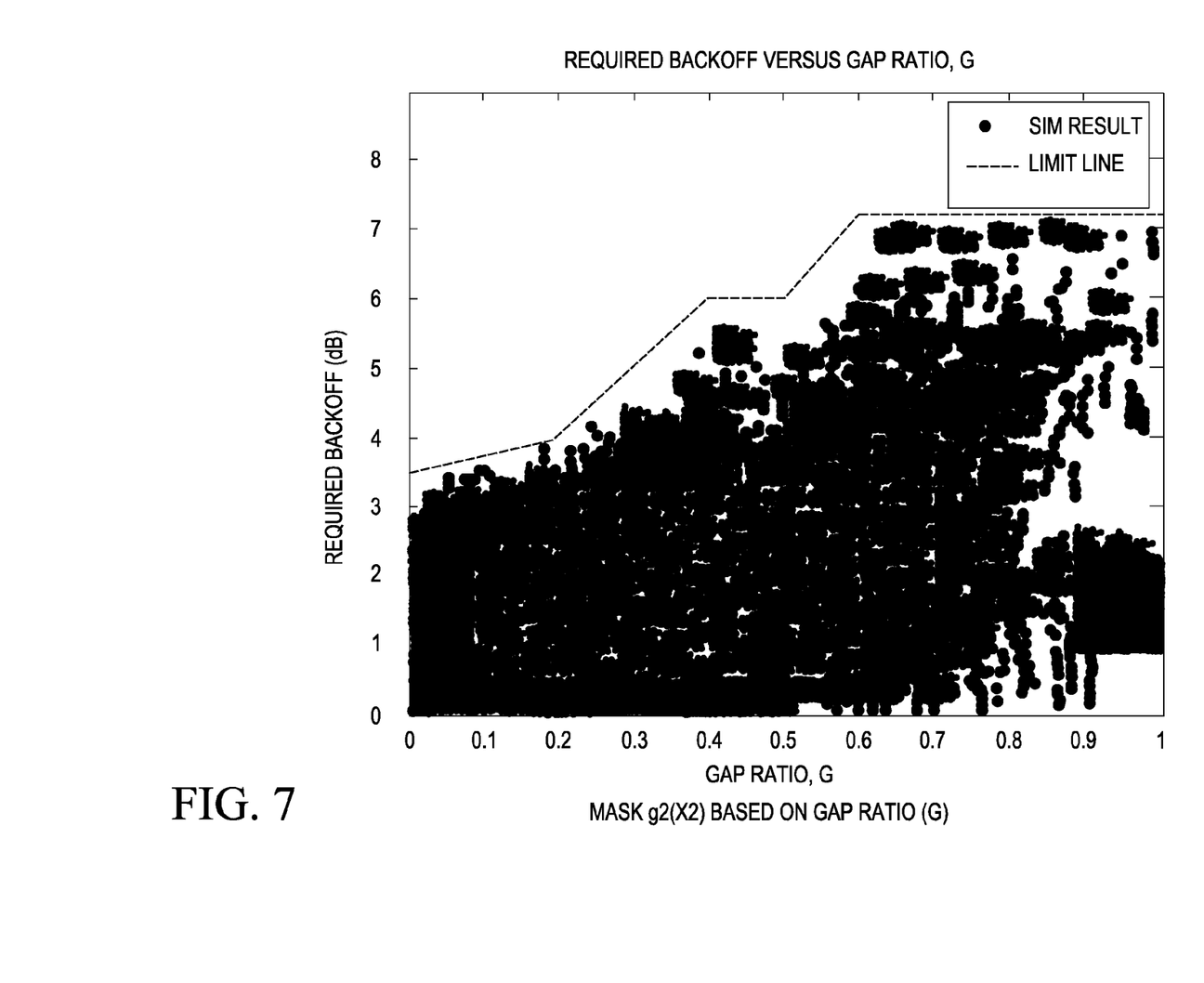
FIG. 7 is a plot of power backoff versus Mask g2(X2).

This can be illustrated with an example. Suppose that $X_2$=G, the Gap ratio. The piece-wise linear upper bound for $g_2(X_2)$ is shown in FIG. 7. Suppose that there is a multi-cluster allocation over a 10 MHz aggregated UL PUSCH1 (with UCI)+PUSCH2, where the PUSCH1 (w/UCI) on CC1 spans 1 RB with starting location RB index=2 and PUSCH2 on CC2 spans RBs with RB index=4-10. Clearly, from the definitions, A=0.16 and G=0.04. The piece-wise linear masks according to the MPR equation in TR 36.807 as a function of A (from FIG. 5) and as a function of G (from FIG. 7) indicate MPR limits equal to 5.4 dB and 3.6 dB. Clearly, if the MPR definition from TR 36.807 is used, the UE is allowed a backoff 5.4 dB although, for this configuration, a backoff 3.6 dB is sufficient. This means that the current definition of MPR is suboptimal for multi-cluster allocations as it leads to excessive MPR limits. The method of taking min $\{g_1(X_1), g_2(X_2)\}$ correctly identifies the limiting factors and allows the UE to only apply the smallest upper bound on MPR.

This approach can be extended to the multiple variable case $Y \leq \min\{g_1(X_1), g_2(X_2), g_3(X_3), \ldots\}$. In addition, joint dependences in one or more of the masks can be considered. For example, we can group the variables such that $Y \leq \min\{g_1(X_1), g_{23}(X_2, X_3)\}$ where the function $g_{23}(X_2, X_3)$ describes a joint dependence of MPR on $X_2$ and $X_3$. For example, the variables E and W are closely related and may be grouped together to obtain a joint mask.

The solutions A, B, C and D can be merged into a unified solution as follows:

Step 1. UE determines nominal UL transmit powers for different clusters based on power control equations and also determines if the power difference between the cluster with maximum transmit power $p_{max}$ and minimum transmit power $p_{min}$ is above a threshold, $p_{max} - p_{min} > P_{spread}$. Two options are possible:

Option 1: $p_{min}$ corresponds to a non-UCI PUSCH, in which case the UE rescales power of this non-UCI PUSCH cluster such that the power difference is brought to within $P_{spread}$. The UE uses the equation MPR=f1(A, ...) to compute the MPR. Proceed to step 2.

Option 2: $p_{min}$ corresponds to UCI PUSCH, in which case, the power cannot be rescaled. The UE uses equation MPR=f2(A, ...) to determine MPR. Proceed to step 2.

Step 2. There are two possibilities:
i. If the equation selected is MPR=f1(A, ...), MPR is limited by OOB/in-band emissions. Three sub-options are possible:
  a. Option i-1: The MPR mask as defined in TR 36.807 can be used to compute MPR although it may be suboptimal.
  b. Option i-2: MPR can determined using the MPR=g (delta P, A) parameterization in Solution C that uses a smaller backoff when there is a power imbalance such that power imbalance is limited to $P_{spread}$.
  c. Option i-3: Solution D can be used where MPR is determined using MPR=min(g1, g2) to further reduce the allowed MPR.
ii. If the equation selected is MPR=f2(A, ...), then the allocation is limited by EVM. We need a larger MPR mask relative to that in TR 36.807.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device, the method comprising:

determining transmission powers for at least two clusters, wherein each cluster includes at least one physical resource block;

determining a difference in a characteristic of the transmission powers determined for the at least two clusters; and reducing a transmit power allocated to at least one cluster if the difference in the power characteristic exceeds the threshold;

wherein reducing the transmit power allocated to the at least one cluster based on:

$$\sum_{j \ne j_0} w_j(i) \cdot \hat{P}_{PUSCH,j}(i) \le \hat{P}_{c,max}(i) - \hat{P}_{PUCCH}(i) -$$

$$\hat{P}_{PUSCH,j_0}(i) \max_j \left( w_j(i) \hat{P}_{PUSCH,j}(i) \right) - \min_j \left( w_j(i) \cdot \hat{P}_{PUSCH,j}(i) \right) \le P_{spread},$$

where $\min_j()$ is taken over only positive-valued arguments where $\hat{P}_{PUSCH,j}(i)$ is a linear value of the power allocated to a j-th Physical Uplink Shared Channel ("PUSCH") in subframe i; $\hat{P}_{c,max}(i)$ is a configured maximum transmit power; $\hat{P}_{PUCCH}(i)$ is a linear value of the power allocated to a Physical Uplink Control Channel ("PUCCH") in subframe i; $w_j(i)$ is a power scaling factor applied to a j-th PUSCH in subframe i; Index j=j0 corresponds to a PUSCH carrying Uplink Control Information;

wherein a power scaling factor $w_j(i)$ is set to zero for at least one index j; and wherein the power allocated to each cluster is a function of pathloss between the wireless communication device and a serving base station.

2. The method of claim 1 wherein at least one of the at least two clusters is for PUCCH transmission and another of the at least two clusters is for PUSCH transmission.

3. The method of claim 1 wherein the at least two clusters are for PUSCH transmission.

* * * * *